W PATTERSON.

Improvement in Animal-Traps.

No. 129,295.

Patented July 16, 1872.

WITNESSES.
E. H. Bates
Geo. E. Upham.

INVENTOR.
Warren Patterson
Chipman Hosmer & Co
Attys 129,295

UNITED STATES PATENT OFFICE.

WARREN PATTERSON, OF WAUKEGAN, ILLINOIS.

IMPROVEMENT IN ANIMAL-TRAPS.

Specification forming part of Letters Patent No. 129,295, dated July 16, 1872.

*To all whom it may concern:*

Be it known that I, WARREN PATTERSON, of Waukegan, in the county of Lake and State of Illinois, have invented a new and valuable Improvement in Animal-Traps; and I do hereby declare that the following is a full, clear, and exact description of the construction and operation of the same, reference being had to the annexed drawing making a part of this specification, and to the letters and figures of reference marked thereon.

Figure 1:
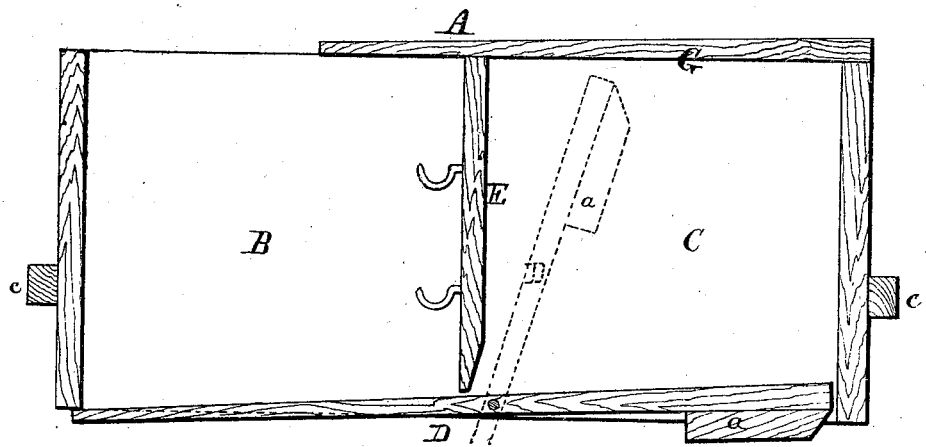
Figure 2:
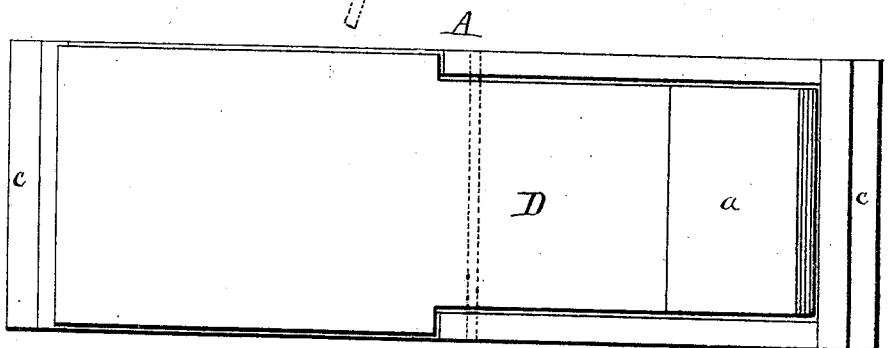

Figure 1 of the drawing is a representation of a sectional view of my invention. Fig. 2 is a bottom view of the same.

My invention has relation to animal-traps; and consists in the novel construction and arrangement hereinafter described, whereby an effective trap is formed for use above a barrel or other receptacle of water or liquid.

A of the drawing represents a box, usually of a rectangular form, and divided into two compartments, marked, respectively, B and C. The letter D represents a pivoted and weighted bottom for the box, that serves as a tilting platform to the animal. E represents the central partition, to one side of which are attached hooks to receive and hold the bait. G represents the top of the box, which extends entirely over the compartment C, and, a short distance therefrom, over compartment B. The letter $a$ represents a weight attached to the tilting bottom, and the letters $c\ c$ are cleats, serving the purpose hereinafter named.

In using my trap I usually take a barrel, tank, or cask and fill it with water or other liquid to a point about one foot, more or less, from its top. I then make an opening in the top or cover, of the same shape as the box, and place the same therein in such manner that the cleats $c$ shall rest upon the said top or cover and hold the box securely. I then place the bait upon the hooks, and my work is complete. The animal, in pursuit of the bait, leaps down upon the tilting platform, and is precipitated into the water. When this is done the weight $a$ restores the platform to its original position, thereby resetting the trap.

What I claim as new is—

The animal-trap herein described, having compartments B and C, extended top G, and weighted tilting platform D, constructed and arranged substantially as and for the purpose specified.

In testimony that I claim the above I have hereunto subscribed my name in the presence of two witnesses.

WARREN PATTERSON.

Witnesses:
 DANIEL BREWER,
 JAMES B. WELCH.